(12) United States Patent
Goda et al.

(10) Patent No.: US 12,530,288 B2
(45) Date of Patent: Jan. 20, 2026

(54) READ DISTURB TRACKING AMONG MULTIPLE ERASE BLOCKS COUPLED TO A SAME STRING

(71) Applicant: Micron Technology, Inc., Boise, ID (US)

(72) Inventors: Akira Goda, Setagaya (JP); Niccolo' Righetti, Boise, ID (US); Shyam Sunder Raghunathan, Woodlands (SG); Leo Raimondo, Avezzano (IT); Kishore K. Muccherla, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 138 days.

(21) Appl. No.: 18/386,783

(22) Filed: Nov. 3, 2023

(65) Prior Publication Data

US 2024/0168880 A1 May 23, 2024

Related U.S. Application Data

(60) Provisional application No. 63/426,183, filed on Nov. 17, 2022.

(51) Int. Cl.
*G11C 16/04* (2006.01)
*G06F 12/02* (2006.01)

(52) U.S. Cl.
CPC ................ *G06F 12/0246* (2013.01)

(58) Field of Classification Search
CPC .................................................. G06F 12/0246
See application file for complete search history.

(56) References Cited

U.S. PATENT DOCUMENTS

| 7,177,977 | B2 | 2/2007 | Chen |
| 8,542,530 | B2 | 9/2013 | Hemink |
| 9,786,375 | B2 | 10/2017 | Goda |
| 10,229,740 | B2 | 3/2019 | Cai |
| 2007/0047327 | A1* | 3/2007 | Goda ............... G11C 16/08 365/185.29 |
| 2008/0219053 | A1* | 9/2008 | Kim ............... G11C 16/349 365/185.11 |

OTHER PUBLICATIONS

U.S. Appl. No. 18/386,760, filed Nov. 3, 2023, Goda et al.*

* cited by examiner

*Primary Examiner* — Pho M Luu
(74) *Attorney, Agent, or Firm* — Brooks, Cameron & Huebsch, PLLC

(57) ABSTRACT

An apparatus can comprise a memory array comprising multiple erase blocks coupled to a same plurality of strings of memory cells. A controller is configured to monitor a cumulative amount of read disturb stress experienced by a first erase block by: maintaining a read disturb count corresponding to the first erase block; incrementing the read disturb count by a first amount responsive to read commands issued to addresses corresponding to the first erase block; incrementing the read disturb count by a read disturb scaling factor responsive to read commands issued to addresses corresponding to the second erase block; and incrementing the read disturb count by a program scaling factor responsive to program commands issued to addresses corresponding to the second erase block. The controller can perform an action on the first erase block responsive to the read disturb count exceeding a threshold value.

20 Claims, 13 Drawing Sheets

|  | PROGRAM TOP DECK | READ/PROGRAM VERIFY TOP DECK |
|---|---|---|
| BL | 0V | 0.5V |
| SGD | 3V | 5V |
| UNSELECTED WL (TOP) | Vpass (10V) | Vpassr (8V) |
| . . . | . . . | . . . |
| UNSELECTED WLn-1 (TOP) | Vpass (10V) | Vpassr1 (8.5V) |
| SELECTED WLn (TOP) | Vpgm (20V) | Vread (0V-7V) |
| UNSELECTED WLn+1 (TOP) | Vpass (10V) | Vpassr1 (8.5V) |
| . . . | . . . | . . . |
| UNSELECTED WL (TOP) | Vpass (10V) | Vpassr (8V) |
| DUMMY WL(s) | Vpass (10V) | Vpassr (8V) |
| UNSELECTED WL (BOTTOM) | Vpass (10V) | Vpassr (8V) |
| . . . | . . . | . . . |
| UNSELECTED WL (BOTTOM) | Vpass (10V) | Vpassr (8V) |
| SGS | 0V | 5V |
| SL | 2V | 0V |

| STRESS TYPE / OPERATION | VICTIM DECK |
|---|---|
| READ VICTIM DECK | READ COUNT INCREMENT +X (CAN BE INCREMENTED BY SCALING FACTOR WHICH CAN BE FUNCTION OF READ TO READ DELAY) |
| PROGRAM AGGRESSOR DECK | READ COUNT INCREMENT BY SCALING FACTOR (E.G., +2X, +3X, +4X,) WHICH CAN BE FUNCTION OF PGM TO PGM INTERVAL |
| READ AGGRESSOR DECK | READ COUNT INCREMENT BY SCALING FACTOR (E.G., +0.2X, +0.3X, +0.4X,) WHICH CAN BE FUNCTION OF READ TO READ INTERVAL |

Fig. 8

READ DISTURB TRACKING AMONG MULTIPLE ERASE BLOCKS COUPLED TO A SAME STRING

PRIORITY INFORMATION

This application claims the benefit of U.S. Provisional Application No. 63/426,183, filed on Nov. 17, 2022, the contents of which are incorporated herein by reference.

TECHNICAL FIELD

Embodiments of the disclosure relate generally to memory systems, and more specifically, relate to apparatuses and methods for read disturb tracking among multiple erase blocks coupled to a same string.

BACKGROUND

A memory system can include a memory sub-system, which can be a storage device, a memory module, or a hybrid of a storage device and a memory module. Examples of a storage device include a solid-state drive (SSD), a Universal Flash Storage (UFS) drive, a secure digital (SD) card, an embedded Multiple Media Card (eMMC), and a hard disk drive (HDD). Examples of memory modules include a dual in-line memory module (DIMM) and various types of non-volatile dual in-line memory modules (NVDIMMs). Memory systems include one or more memory components (e.g., memory devices) that store data. The memory components can be, for example, non-volatile memory components (e.g., NAND flash memory devices) and volatile memory components (e.g., DRAM devices). In general, a host system can utilize a memory system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3B is a table illustrating bias voltages associated with performing operations on a memory array having multiple erase blocks per string in accordance with various embodiments of the present disclosure.

FIG. 8 is a table illustrating an example of victim read count increments associated with different operations performed on a victim deck and an aggressor deck in association with tracking read disturb in an array having multiple erase blocks coupled to a same string in accordance with various embodiments of the present disclosure.

DETAILED DESCRIPTION

Figure 1:
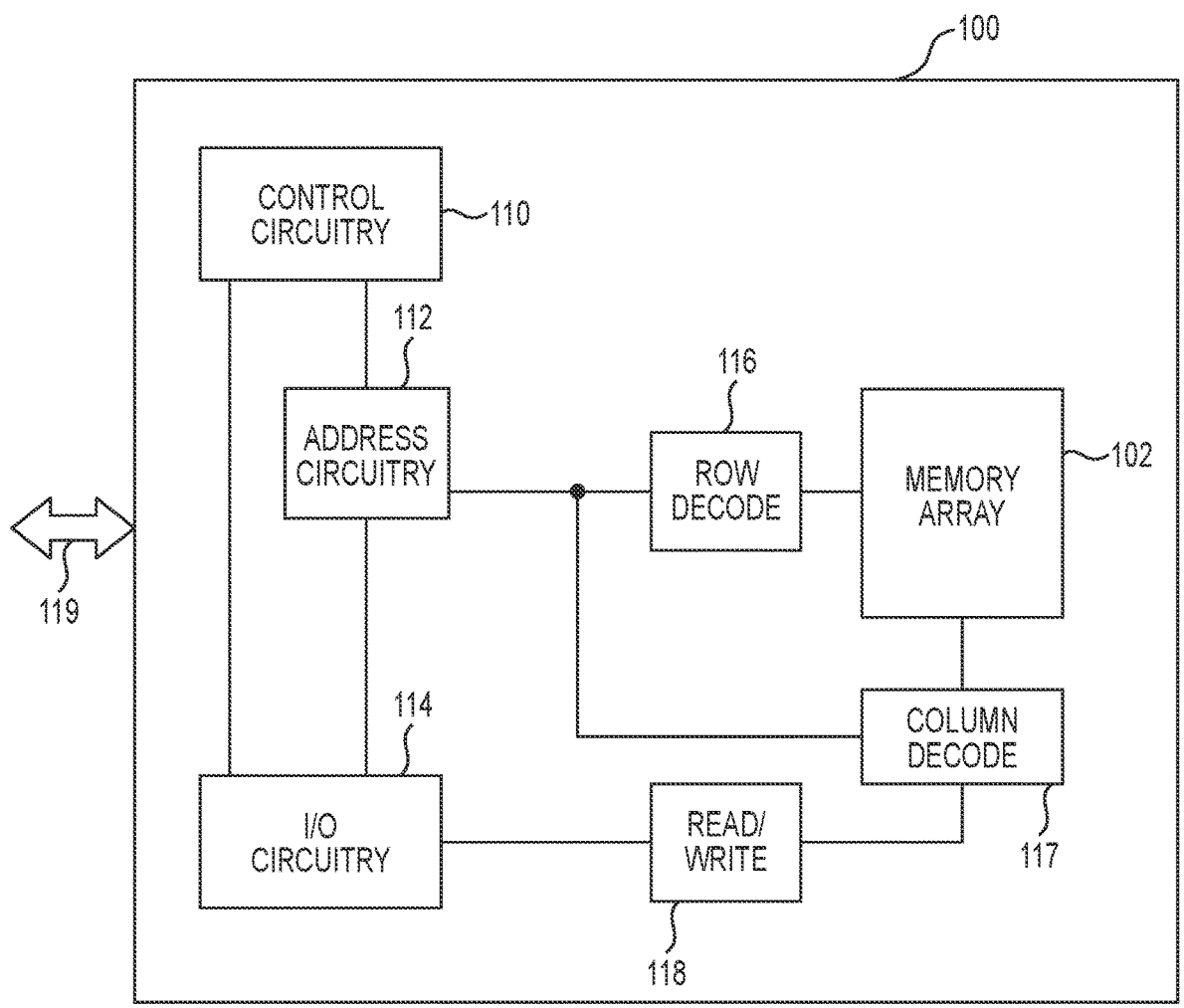
FIG. 1 illustrates an example portion of a memory system including a memory device having and array in accordance with various embodiments of the present disclosure.

Aspects of the present disclosure are directed to apparatuses and methods for read disturb tracking among multiple erase blocks coupled to a same string. Various types of memory, such as NAND flash memory, include a memory array of many memory cells that can be arranged in row and column fashion and grouped in physical blocks. The cells can be floating gate transistors that can be programmed to store one more bits by adding charge to the floating gate. Generally, an erase operation (e.g., a "block erase") is performed to erase all of the cells of a block together as a group.

Three-dimensional (3D) flash memory (e.g., a 3D NAND memory array) can include multiple strings of memory cells with each string comprising multiple series-coupled (e.g., source to drain) memory cells in a vertical direction, with the memory cells of a string sharing a common channel region. Each memory cell of a string can correspond to a different tier of the memory array, with a group of strings sharing multiple access lines, which may be referred to as word lines (WLs). Each access line can be coupled to respective memory cells of each string in the group of strings (e.g., the memory cells of a particular tier of the memory array). Groups of strings are coupled to respective sense lines, which may be referred to as data lines or bit lines (BLs), of a group of sense lines. The cells of the strings can be positioned between a drain-side select gate (referred to as a select gate drain (SGD)) and a source-side select gate (referred to as select gate source (SGS)) used to control access to the strings.

A 3D memory array can comprise multiple physical blocks each comprising a plurality of memory pages (e.g., physical pages of cells than can store one or more logical pages of data). In various previous approaches, a block of memory cells corresponds to a smallest group of memory cells that can be erased. For example, in prior approaches it is not possible to erase some of the memory cells of a block while maintaining data in other memory cells of the block.

Some prior approaches that may provide an ability to erase some memory cells of a block while maintaining data in other memory cells of the block can suffer various drawbacks. For example, if a first group of cells within a block share a string with a second group of cells within the same block, read operations and program operations (e.g., program verify operations) performed on the first group of cells can lead to read disturb of the second group of cells. Such disturb results in threshold voltage (Vt) shifts of the second group of memory cells, which can result in increased bit error rates (BERs) and/or loss of data.

Various embodiments of the present disclosure address the above and other deficiencies by providing apparatuses and methods that can track read disturb among multiple erase blocks coupled to a same string. As used herein, an "erase block" refers to a group of cells that are configured to be erased together as a group and that share a same string as one or more additional groups of cells (e.g., one or more additional erase blocks). An erase block may also be referred to as a "deck." Decks experiencing disturb due to operations (e.g., read operations, programming operations) performed on one or more other decks sharing a string are referred to as "victim" decks, with the one or more other decks being referred to as "aggressor" decks.

As described further herein, various embodiments can include monitoring a cumulative amount of read disturb experienced by a first erase block (e.g., a victim deck) due to read operations performed on the first erase block, read operations performed on a second erase block (e.g., an aggressor deck), and program verify operations performed on the second erase block. An action can be performed on the first erase block responsive to determining that the cumulative amount of read disturb has met a particular criteria. In various embodiments, the particular criteria can be a victim read disturb count exceeding a threshold value (e.g., 50,000; 100,000; 250,000; etc.). The action taken responsive to the criteria being met can be, for example, a refresh of the first erase block, which can include writing valid data from the first erase block to a different erase block. Alternatively, the action performed can be a scan of the first block, which can include reading the data stored in the first erase block to measure its bit error rate (BER), for example.

Another example embodiment can include an array having multiple erase blocks coupled to a same string. A controller is coupled to the array and configured to: monitor an amount of read disturb stress experienced by the first erase block due to read operations performed on the first erase block; monitor an amount of read disturb stress experienced by the first erase block due to read operations performed on the second erase block; and monitor an amount of read disturb stress experienced by the first erase block due to program verify operations performed on the second erase block. The controller is configured to perform an action on the first erase block responsive to one or more of: a determination that the amount of read disturb stress experienced by the first erase block due to read operations performed on the first erase block has met a first criteria; a determination that the amount of read disturb stress experienced by the first erase block due to read operations performed on the second erase block has met a second criteria; and a determination that the amount of read disturb stress experienced by the first erase block due to program verify operations performed on the second erase block has met a third criteria.

Various embodiments can include maintaining a read disturb count corresponding to the first erase block, incrementing the read disturb count by a first amount responsive to read commands issued to addresses corresponding to the first erase block, incrementing the read disturb count by a read disturb scaling factor responsive to read commands issued to addresses corresponding to the second erase block, and incrementing the read disturb count by a program scaling factor responsive to program commands issued to addresses corresponding to the second erase block. An action can be performed on the first erase block responsive to the read disturb count exceeding a threshold value. Implementing a read disturb scaling factor can provide benefits such as providing a more accurate measure of read disturb experienced by a victim erase block, which can improve the efficiency of refresh/scan management, for example. Embodiments are not limited to the above examples.

FIG. 1 illustrates an example portion of a memory system including a memory device 100 having and array 102 in accordance with various embodiments of the present disclosure. The memory array 102 can be a 3D NAND array such as described further in association with FIG. 2, for example. The array can comprise single level cells (SLCs) storing 1 bit per cell, multilevel cells (MLCs) storing 2 bits per cell, triple level cells (TLCs) storing three bits per cell, or quad level cells (QLCs) storing 4 bits per cell, for example. Embodiments are not limited to a particular type of memory cell. The memory device 100 can be part of a memory system such as memory system 1190 described in FIG. 11.

The memory device 100 includes control circuitry 110, address circuitry 112, input/output (I/O) circuitry 114 used to communicate with an external device via an interface 119, which may be a bus used to transmit data, address, and control signals, among other signals between the memory device 100 and an external host device, which can include a controller, host processor, etc., that is capable of accessing the memory array 102. As an example, the memory device 100 can be within a system such as an SSD with the interface 119 coupling the memory device 100 to a system controller. The interface 119 can include a combined address, control, and data bus or separate busses depending on the particular physical interface and corresponding protocol. The interface 119 can be an Open NAND Flash Interface (ONFI) interface or a Non-Volatile Memory Express (NVMe) interface; however, embodiments are not limited to a particular type of interface or protocol.

The control circuitry 110 can decode signals (e.g., commands) received via interface 119 and executed to control operations performed on the memory array 102. The operations can include data programming operations, which may be referred to as write operations, data read operations, which may be referred to as sensing operations, data erase operations, etc. The control circuitry 110 can cause various groups of memory cells (e.g., pages, blocks, erase blocks, etc.) to be selected or deselected in association with performing memory operations on the array 102. The control circuitry 110 can comprise a state machine, a sequencer, and/or some other type of control circuitry, which may be implemented in the form of hardware, firmware, or software, or any combination thereof.

The I/O circuitry 114 is used for bi-directional communication of data between the memory array 102 and the external host via interface 119. The address circuitry 112, which can include a register, can latch address signals received thereto, and the address signals can be decoded by a row decoder 116 and a column decoder 117 to access the memory array 102. The memory device 100 includes read/write circuitry 118 used to read data from and write data to the memory array 102. As an example, the read/write circuitry can include various latch circuitry, drivers, sense amplifiers, buffers, etc. Data can be read from the memory array 102 by sensing voltage and/or current changes on bit lines of the memory array 102.

Figure 2:
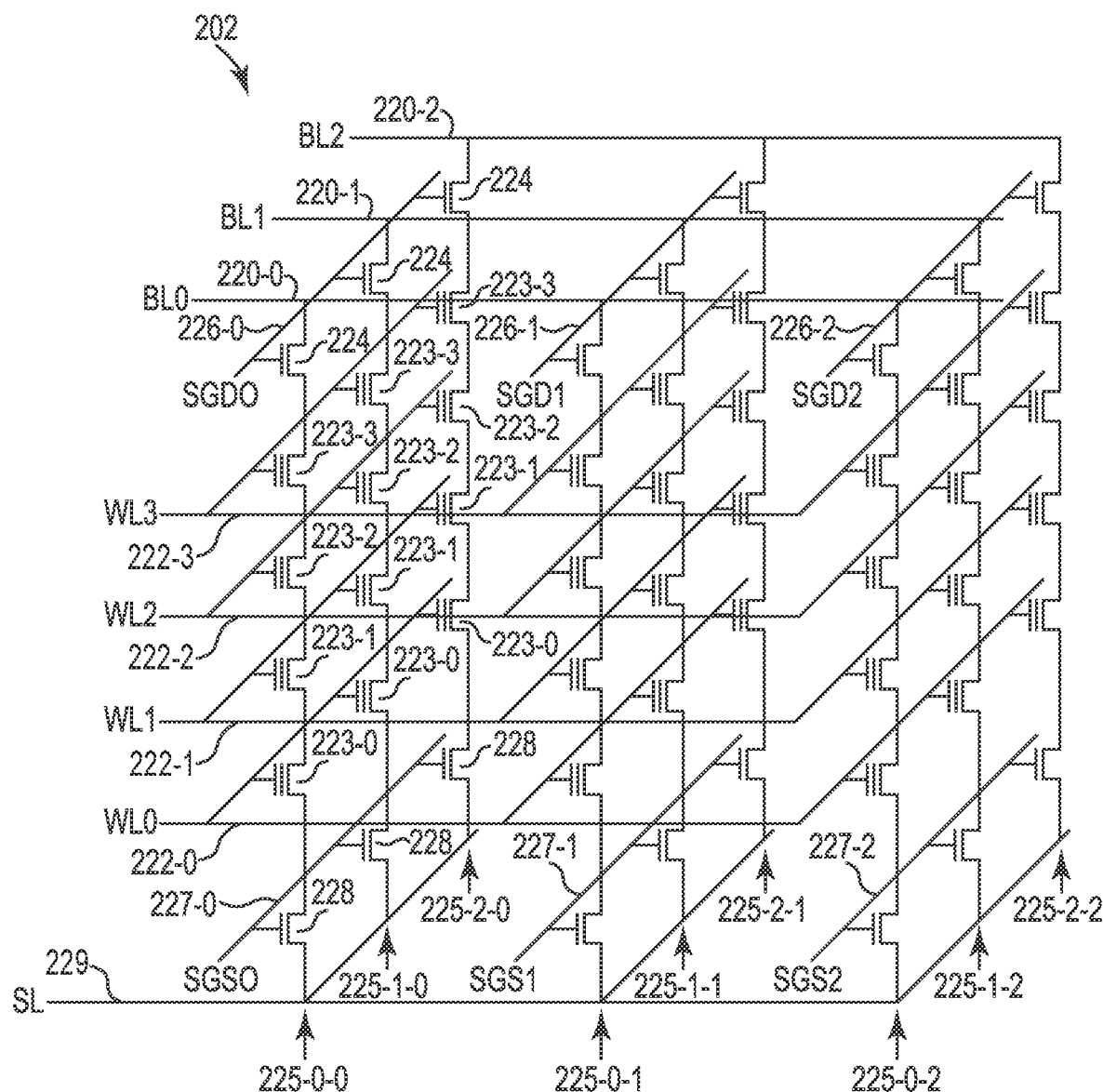
FIG. 2 is a schematic diagram illustrating an example memory array in accordance with various embodiments of the present disclosure.

FIG. 2 is a schematic diagram illustrating an example memory array 202 in accordance with various embodiments of the present disclosure. The memory array 202 can be located in a memory device such as memory device 100 described in FIG. 1, for example. The memory array 200 is a 3D NAND array.

The memory array 200 comprises a number of access lines (word lines) 222-0 (WL0), 222-1 (WL1), 222-2 (WL2), and 222-3 (WL3) and a number of sense lines (bit lines) 220-0 (BL0), 220-1 (BL1), and 220-2 (BL2) coupled to multiple strings 225-0-0, 225-0-1, 225-0-2, 225-1-0, 225-1-1, 225-1-2, 225-2-0, 225-2-1, and 225-2-2. The word lines, bit lines, and strings are collectively referred to as word lines 222, bit lines 220, and strings 225, respectively. Although four word lines 222, three bit lines 220, and nine strings 225 are shown, embodiments are not so limited.

Each of the strings 225 comprises a number of memory cells (referred to collectively as memory cells 223) located between a select transistor 224 and a select transistor 228. For example, as shown in FIG. 2, strings 225-0-0, 225-1-0, and 225-1-2 each respectively comprise memory cells 223-0, 223-2, 223-2, and 223-3 located between select transistors 224 and 228 (e.g., respective drain-side select gate (SGD) 224 and source-side select gate (SGS) 228). The memory cells 223 can be floating gate transistors with the cells 223 of a given string 225 sharing a common channel region (e.g., pillar). As shown, the memory cells 223 of a given string are series-coupled source to drain between the SGD transistor 224 and the SGS.

The memory cells 223 of the strings 225 are stacked vertically such that they are located on distinct tiers/levels of the memory array 202. Each word line 222 can be commonly coupled to all the memory cells at a particular tier/level. For example, word line 222-0 can be coupled to (e.g., as the control gate) the nine memory cells 223-0 corresponding to the nine respective strings 225.

The select gate transistors 224 and 228 can be controlled (e.g., turned on/off) via the corresponding select gate signals SGD0, SGD1, SGD2, SGS0, SGS1, and SGS2 in order to couple the strings 225 to their respective bit lines 220 and a common source line (SL) 229 during memory operations (e.g., reads, writes, erases). As shown in FIG. 2, the select gate signals SGD0, SGD1, and SGD2 are provided (e.g., to the gates of transistors 224) via respective conductive lines 226-0, 226-1, and 226-2, and the select gate signals SGS0, SGS1, and SGS2 are provided (e.g., to the gates of transistors 228) via respective conductive lines 227-0, 227-1, and 227-2. Although the signals SGS0, SGS1, and SGS2 are shown on separate conductive lines 227, in some embodiments the conductive lines 227-0, 227-1, and 227-2 may be coupled via a common SGS line.

To perform memory operations on the array 202, particular voltages (e.g., bias voltages) can be applied to the word lines 222, bit lines 220, and source line 229. The particular voltages applied depends on the memory operation being performed, and different voltages may be applied to the word lines 222 during a particular memory operation in order to store data in a cell (or page of cells) or read data from a cell. Example biasing schemes are described in more detail in association with FIGS. 3A and 3B.

Figure 3A:
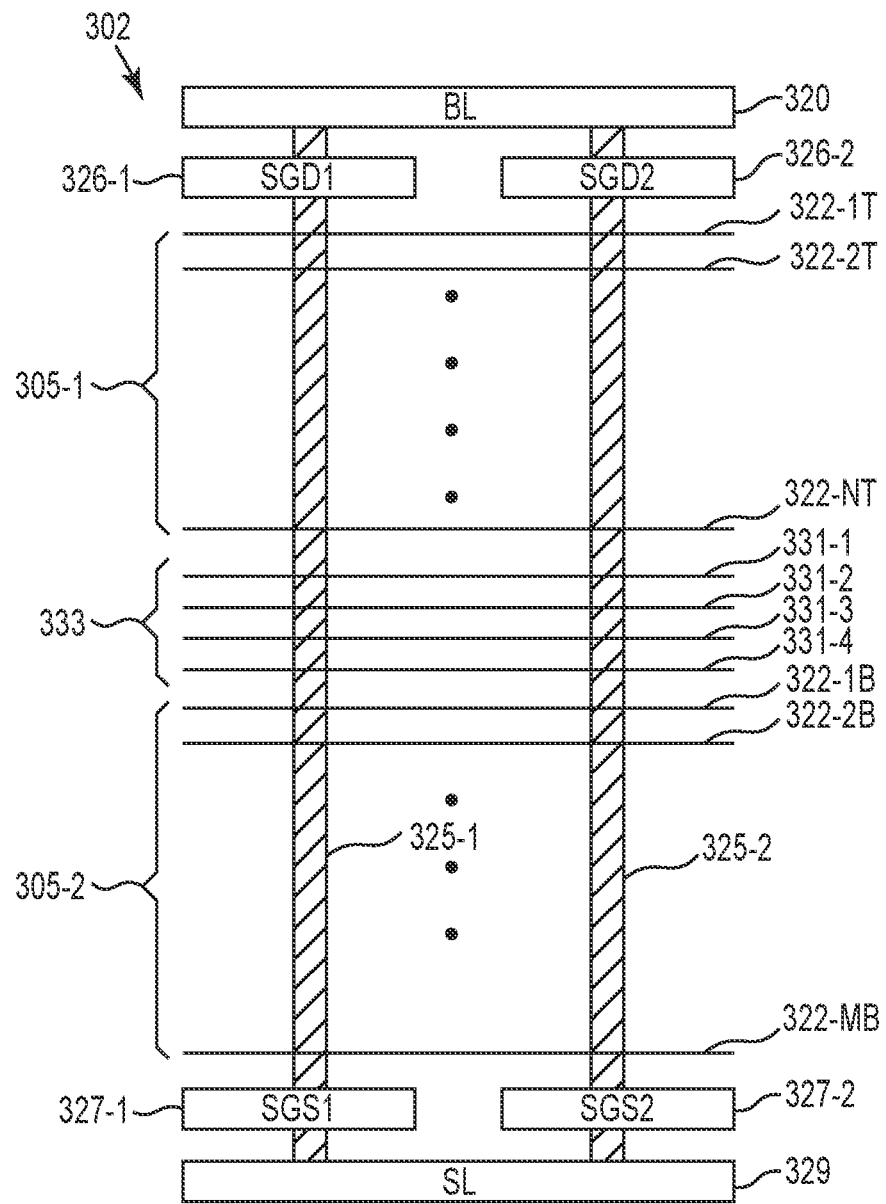
FIG. 3A schematically illustrates a portion of a memory array having multiple erase blocks per string in accordance with various embodiments of the present disclosure.

As described further in FIGS. 3A and 3B, the memory cells 223 of the array 202 can represent a physical block of memory cells that can comprise multiple (e.g., two or more) physical erase blocks. As an example, the word lines 222-0 and 222-1 can be coupled to cells of a first erase block, and the word lines 222-2 and 222-3 can be coupled to cells of a second/different erase block. Therefore, the cells 223-0 and 223-1 of the nine respective strings 225 (e.g., the cells of the first erase block) share respective common strings with the cells 223-2 and 223-3 (e.g., the cells of the second erase block).

As further described herein, an array (e.g., 202) can comprise a number of word lines physically between (e.g., separating) the word lines (e.g., 222) corresponding to different erase blocks. The word lines separating word lines corresponding to different erase blocks can be referred to as "dummy" word lines and can be coupled to dummy memory cells (e.g., within the strings 225) that are not used to store data. The dummy word lines and/or dummy cells can facilitate the ability to perform erase operations separately on erase blocks that share a common string or strings. The quantity of dummy word lines between erase blocks can vary, and various bias voltages can be applied to the dummy word lines during the various memory operations performed on the erase blocks.

In operation, erase blocks can be separately (e.g., individually) selected or deselected. For example, an erase operation can be performed on a selected first erase block corresponding to a group of strings while other erase block(s) corresponding to the same group of strings is deselected (e.g., such that is not erased). As described further herein, erase blocks that have been programmed can experience disturb (e.g., Vt voltage shifts of the constituent cells) when a neighbor erase block (e.g., a different erase block corresponding to the same strings) is programmed, read, and/or erased. As one example, a victim erase block (e.g., victim deck) can experience read disturb due to read operations performed on the victim erase block itself, as well as due to read operations and program verify operations performed on aggressor erase blocks coupled to the same string.

FIG. 3A schematically illustrates a portion of a memory array 302 having multiple erase blocks per string in accordance with various embodiments of the present disclosure. FIG. 3B is a table illustrating bias voltages associated with performing operations on a memory array having multiple erase blocks per string in accordance with various embodiments of the present disclosure, such as the array 302 shown in FIG. 3A. The example shown can be a portion of the array 202 described in FIG. 2. The array portion 302 can be a portion of a physical block of memory cells that includes multiple erase blocks (e.g., decks).

In this example, the array 302 includes a plurality/group of word lines 322-1T, 322-2T, . . . , 322-NT corresponding to a first erase block 305-1 (e.g., a top deck) and a plurality/group of word lines 322-1B, 322-2B, . . . , 322-MB corresponding to a second erase block 305-2 (e.g., bottom deck). The designators "N" and "M" can represent various numbers (e.g., 3 or more) and "N" and "M" can be the same number. Accordingly, embodiments are not limited to a particular quantity of word lines 322 for the top deck 305-1 or bottom deck 305-2 (the designator "T" corresponding to "top" and the designator "B" corresponding to "bottom"). The array 302 also includes a number of dummy word lines 331-1, 331-2, 331-3, and 331-4, which can be collectively referred to as word lines 331. The dummy word lines 331 correspond to a separation region 333 between the top deck 305-1 and bottom deck 305-2. Although four word lines 331 are illustrated, embodiments can include more or fewer than four dummy word lines 331 separating erase blocks corresponding to same strings.

The array portion 302 illustrates two strings 325-1 and 325-2 for ease of illustration; however, embodiments can include many more strings 325. Memory cells are located at the intersections of the word lines 322/331 and strings 325, with the memory cells of a particular string 325 sharing a common channel region (e.g., pillar) as described in FIG. 2. The dummy word lines 331 can be coupled to dummy memory cells (e.g., cells that are not addressable to store user data).

As illustrated in FIG. 3A, a first end of the strings 325-1 and 325-2 can be coupled to a common source line 329 via respective select gate source lines 327-1 (SGS1) and 327-2 (SGS2). The second/opposite end of the strings 325-1 and 325-2 can be coupled to a bit line 320 via respective select gate drain lines 326-1 (SGD1) and 326-2 (SGD2). As such, the strings 325 (e.g., the cells thereof) can be individually accessed using the bit line 320 and select gates to which the lines 326-1 and 326-2 are coupled. Although only a single bit line 320 is shown, embodiments can include multiple bit lines such as shown in FIG. 2, for example.

As noted herein, in various embodiments, the top deck 305-1 and the bottom deck 305-2 can be read, programmed, and/or erased via separate operations even though the cells of the decks 305-1/305-2 share the same strings 325-1/325-2. For example, a read operation can be performed on the cells coupled to word lines 322-1T to 322-NT without reading the cells coupled to the word lines 322-1B to 322-MB, and vice versa. Similarly, each one of the decks 305-1 and 305-2 can be individually programmed and/or erased without programming or erasing the other of the decks 305-1 and 305-2.

As described further herein, a particular (e.g., victim) erase block experiences read disturb due to read operations performed on itself, as well as due to read operations and program operations performed on aggressor erase blocks (e.g., other erase blocks coupled to the same strings as the victim erase block). The read disturb to a victim erase block due to program operations performed on an aggressor erase block is due to the program verify operation(s) associated with the program operations. As described below, the biasing voltages associated with a program verify operation are similar to the biasing voltages associated with a read operation. As an example, a particular program operation can include multiple (e.g., 2, 4, 8, 15) program verify operations, with the quantity of program verify strobes depending on the quantity of program states and/or the quantity of programming pulses corresponding to the program operation.

As noted herein, the read disturb (e.g., Vt shifts) experienced by a victim erase block can accumulate due to reads performed on the victim erase block, reads performed on aggressor blocks, and program verify operations performed on the aggressor blocks. The physical separation between the word lines of the top and bottom decks provided by the dummy word lines 331 and/or the bias voltages provided thereto can reduce the Vt shifts experienced by a victim deck (e.g., 305-2); however, repeated reads of the victim deck, reads of an aggressor deck (e.g., 305-1), and program verifies on the aggressor deck (e.g., 305-1) can result in an accumulation of Vt shifts to cells of the victim deck (e.g., 305-2). Such Vt shifts can become particularly detrimental for decks that store relatively "cold" data that may not be refreshed often via a memory management operation such as a garbage collection operation in which valid data of a deck is moved to a different deck prior to erasing the deck. In such instances, an aggressor deck may experience hundreds or thousands of program/erase cycles while the victim deck stores particular valid data.

As described further below, particularly in association with FIG. 6, FIG. 9, and FIG. 11, various embodiments of the present disclosure can monitor the quantity of read operations performed on a particular deck (e.g., victim deck) as well as the quantity of read operations and program verify operations performed on an aggressor deck subsequent to the victim deck having been programmed. As an example, a victim read count can be maintained (e.g., by a controller such as controller 1191 shown in FIG. 11) for each victim deck. For example, whenever a deck is programmed, a corresponding read disturb counter can be reset, and the counter can be incremented for each read on the victim deck, for each read on the aggressor deck, and for each program verify on the aggressor deck. Responsive to the counter meeting a criteria, such as exceeding a threshold count (e.g., 10,000; 100,000; 250,000; 400,000; etc.), an action can be taken. The action taken can include performing a scan operation on the victim deck to determine whether a BER corresponding to the victim deck is such that the data stored in the victim deck should be moved (e.g., rewritten) to a different deck (e.g., a deck in a different physical block that comprises multiple decks). The action taken can also include a refresh operation in which the data stored in the victim block is rewritten to a different deck before the Vt changes due to the cumulative read disturb become sufficient to compromise the integrity of the victim deck data.

As described further herein, in various embodiments, the read disturb counter corresponding to a particular erase block can be incremented by differing amounts depending on various criteria. For example, a read operation to a victim erase block can result in a read disturb count increment of X (with X=1, for example) while a read operation performed on an aggressor erase block can be incremented in accordance with a read disturb scaling factor (e.g., 0.2X, 0.3X, etc.) to account for the fact that reads to the aggressor erase block cause less disturb to the victim erase block than reads to the victim erase block. Similarly, a program operation performed on an aggressor erase block can be incremented by a program scaling factor (e.g., 2X, 3X, 4X, etc.) to account for the fact that program operations to an aggressor erase block cause more disturb to the victim erase block than reads to the victim erase block (e.g., because a program operation comprises multiple program verify operations).

Column 371 of the table shown in FIG. 3B represents the biasing voltages applied to an array (e.g., 302) in association with performing a programming operation on a selected deck (e.g., top deck 305-1). Column 373 represents the biasing voltages applied to the array in association with performing a read operation or a program verify operation on a selected deck (e.g., 305-1). In this example, for purposes of read disturb tracking, the top deck 305-1 represents an aggressor deck and the bottom deck 305-2 (e.g., the unselected deck) represents a victim deck.

The example programming operation shown in FIG. 3B involves applying a programming voltage (Vpgm) to a selected word line (e.g., SELECTED WLn) within the selected deck (e.g., the top deck 305-1). The programming voltage can be applied to the selected word line as a plurality of pulses, for example, and is intended to increase the Vt of a selected cell by adding charge to its floating gate. As illustrated, the unselected word lines of the string (e.g., the remaining word lines of the top deck 305-1, the dummy word lines, and the word lines of the bottom deck 305-2) are biased with a program pass voltage (Vlas). The bit line 320 corresponding to the selected string is biased at 0V, the drain select gate 326 is biased at 3V, the source select gate 327 is biased at 0V, and the source line 329 is biased at 2V during the programming operation.

A programming operation involves performing program verify operations to determine when the Vt of the cells being programmed have reached a desired level. As such, a program verify operation essentially involves performing a read operation on the selected cells (e.g., the cells coupled to the selected word line). As shown in FIG. 3B, a read operation and/or a program verify operation can involve applying a read voltage (Vread) to the selected word line (SELECTED WLn), while applying a read pass voltage (Vpassr or Vpassr1) to the unselected word lines of the string (e.g., the remaining word lines of the top deck 305-1, the dummy word lines, and the word lines of the bottom deck 305-2). The read pass voltage is designed to place the unselected cells of a string in a conductive state in order to allow current to flow through the string depending on the applied read voltage Vread and Vt of the selected cell. In this manner, the read or program verify operation can be used to determine if the Vt of the selected cell is above or below a particular level (e.g., above or below Vread). In this example, the bit line 320 corresponding to the selected string is biased at 0.5V, the drain select gate 326 is biased at 5V, the source select gate 327 is biased at 5V, and the source line 329 is biased at 0V during the read or program verify operation. For multistate memory cells, a read operation can include multiple strobes to distinguish between the multiple possible states of a cell, as described further in association with FIG. 5.

In a number of embodiments, and as shown in FIG. 3B, the unselected word lines (e.g., WLn+1 and WLn−1) adjacent to the selected word line (e.g., WLn) can be biased at a higher read pass voltage (e.g., Vpassr1) as compared to the other unselected word lines, which are biased at Vpassr. As an example, Vpassr1 can be 8.5V-9.5V and Vpassr can be 8V. The increased Vpassr1 voltage can counteract a "pull down" voltage on WLn+1 and WLn−1 that results from coupling between WLn+1/WLn−1 and WLn, depending on the bias (Vread) on WLn. Such pull down can result in cells coupled to WLn+1/WLn−1 not being fully conductive (e.g., turned on) during the read, which can result in read errors. However, the increased Vpassr1 (as compared to Vpassr) can result in increased read disturb stress on the cells coupled to WLn+1 and WLn−1 (e.g., for cells coupled to WLn+1/WLn−1 and that have relatively low Vts).

The increased read disturb stress due to Vpassr1 on a selected deck can be accounted for in cumulative read disturb tracking in accordance with embodiments described herein. For example, a read operation performed on a particular deck (e.g., victim deck 305-2) will result in Vpassr1 read disturb stress to the victim deck 305-1, which is greater than the Vpassr read disturb stress experienced by the victim deck 305-2 responsive to a read performed on the aggressor deck 305-1. As such, in a number of embodiments, a read disturb count corresponding to the victim deck can be incremented by different amounts (e.g., via a scaling factor) for reads performed on the victim deck and an aggressor deck. It is noted that a program verify operation performed on an aggressor deck results in Vpassr read disturb stress on the victim deck as opposed to Vpassr1 read disturb stress. Accordingly, in a number of embodiments, the victim read disturb count can be incremented a same amount for reads and program verify operations performed on aggressor decks. Although, embodiments are not so limited. For example, as described further below, a victim read disturb count can be incremented by different scaling factors for aggressor reads and aggressor program verifies. Additionally, in various embodiments, the victim read disturb count can be incremented by multiple different scaling factors to account for latent read disturb associated with read operations performed on the victim deck, latent read disturb associated with read operations performed on the aggressor deck, and latent read disturb associated with program verify operations performed on the aggressor deck.

Figure 7A:
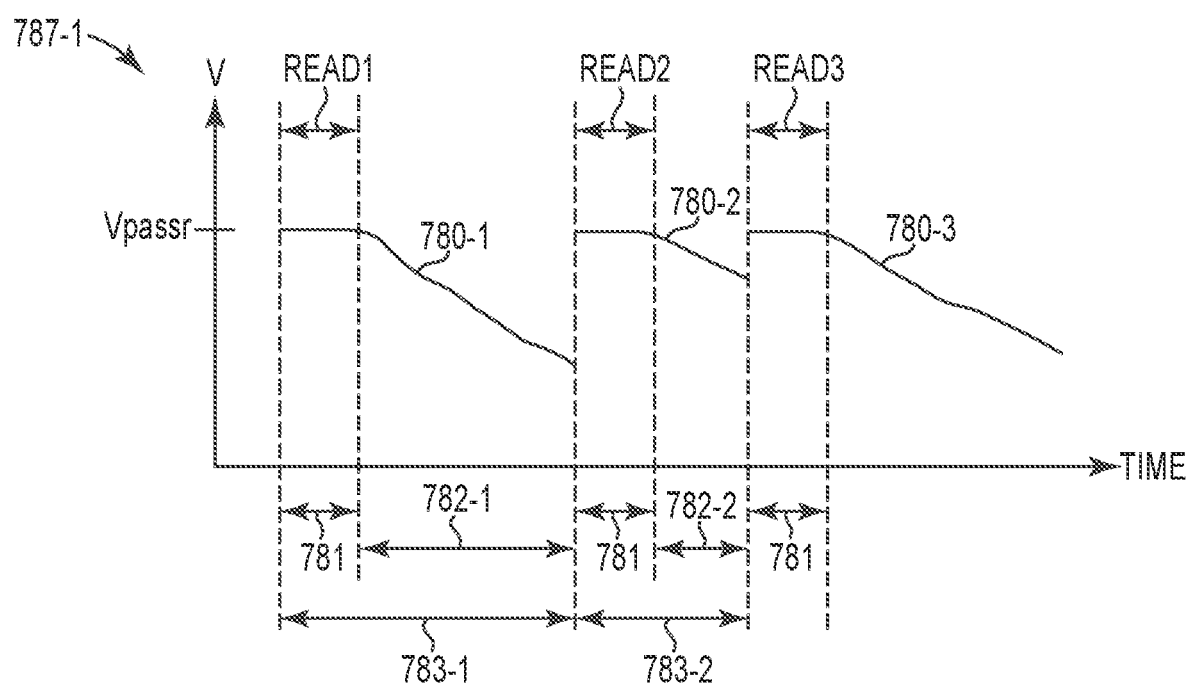
FIG. 7A is a graph illustrating an example of read disturb associated with performing read operations on an array having multiple erase blocks coupled to a same string in accordance with various embodiments of the present disclosure.
Figure 7B:
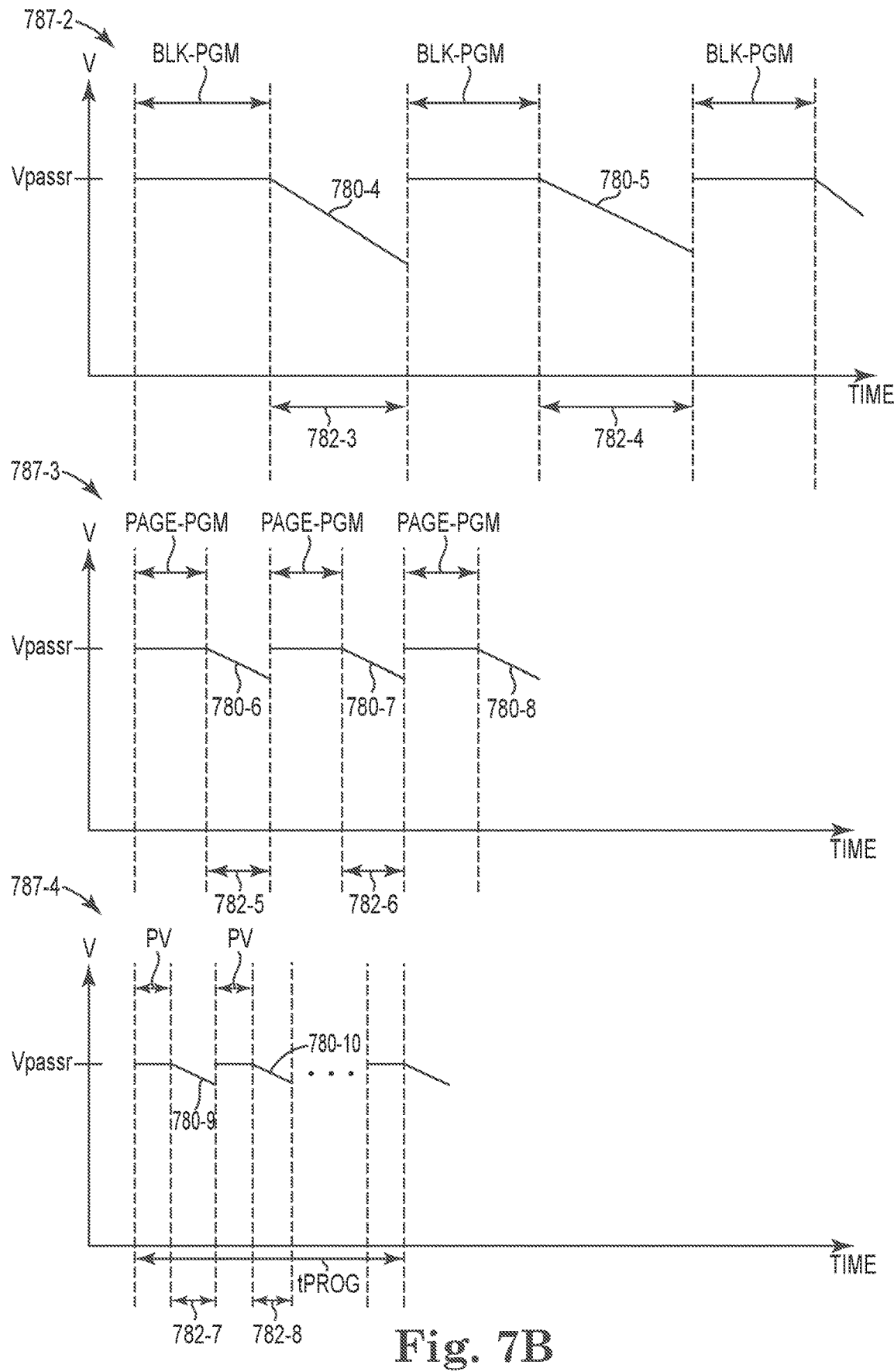
FIG. 7B includes graphs illustrating examples of read disturb associated with performing program operations on an array having multiple erase blocks coupled to a same string in accordance with various embodiments of the present disclosure.

As described further herein in association with FIG. 7A and FIG. 7B, latent read disturb is associated with disturb stress experienced by a victim deck due to residual bias on word lines after a read or program verify operation is completed. As an example, a quantity of program verify operations performed on an aggressor deck with relatively little delay between them will result in a decreased amount of victim read disturb stress as compared to the same quantity of program verify operations performed on the aggressor deck with greater delay between them. In such instances, the victim read disturb count can be incremented by a lesser amount for the program verify operations with little delay than for the program verify operations with greater delay.

Figure 4:
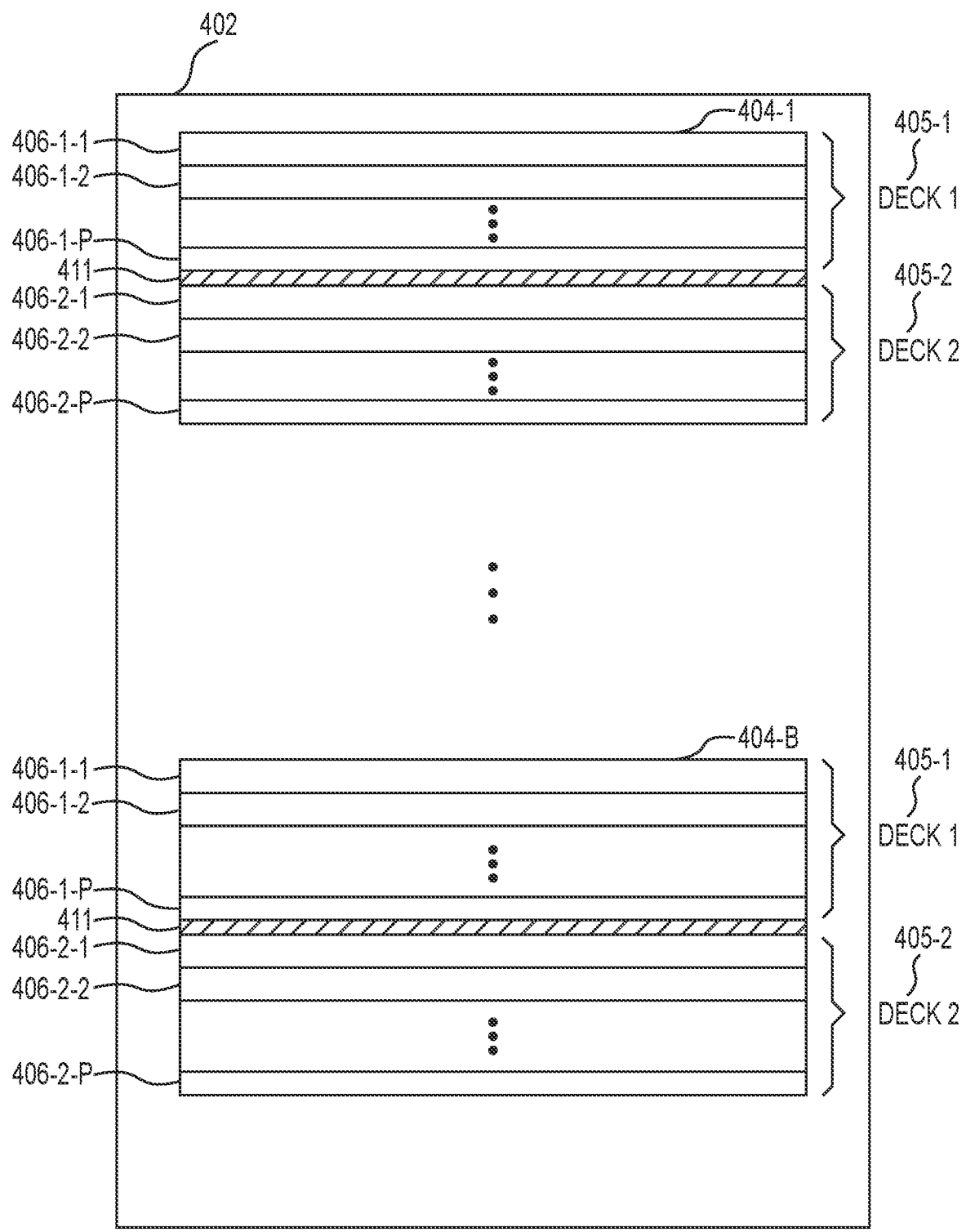
FIG. 4 illustrates a portion of a memory array having multiple erase blocks per string in accordance with various embodiments of the present disclosure.

FIG. 4 illustrates a portion of a memory array 402 having multiple erase blocks per string in accordance with various embodiments of the present disclosure. The memory array 402 includes multiple physical blocks 404-1, . . . , 404-B and can be operated in accordance with one or more embodiments of the present disclosure. The indicator "B" is used to indicate that the array 402 can include a number of physical blocks 404. As an example, the number of physical blocks in array 402 can be 128 blocks, 512 blocks, or 1,024 blocks, but embodiments are not limited to a particular multiple of 128 or to any particular number of physical blocks in an array 402. The memory array 402 can be, for example, a NAND flash memory array (e.g., a 3D NAND flash array such as array 102, 202, and/or 302).

Each of the physical blocks 404-1, . . . , 404-B includes a first erase block 405-1 (DECK_1) and a second erase block 405-2 (DECK_2) separated by a region 411, which can correspond to a region of dummy word lines such as word lines 331 shown in FIG. 3A. As described above, the decks 405-1 and 405-2 are commonly coupled to the strings of the blocks 404-1, . . . , 404-B with the decks 405-1 and 405-2 being separately erasable via a block erase operation (e.g., deck 405-1 can be erased without erasing deck 405-2 and vice versa).

Each deck 405-1 and 405-2 can comprise a number of physical pages, which can correspond to a "row" of the array corresponding to a particular word line. As shown, deck 405-1 comprises pages 406-1-1, 406-1-2, . . . , 406-1-P, and deck 405-2 comprises pages 406-2-1, 406-2-2, . . . , 406-2-P. The designator "P" is used to indicate that the decks 405-1 and 405-2 can comprise a plurality of pages/rows. Each physical page (collectively referred to as pages 406) can store multiple logical pages of data. A page can refer to a unit of programming and/or reading (e.g., a group of cells that are programmed and/or read together as a functional group).

Figure 5:
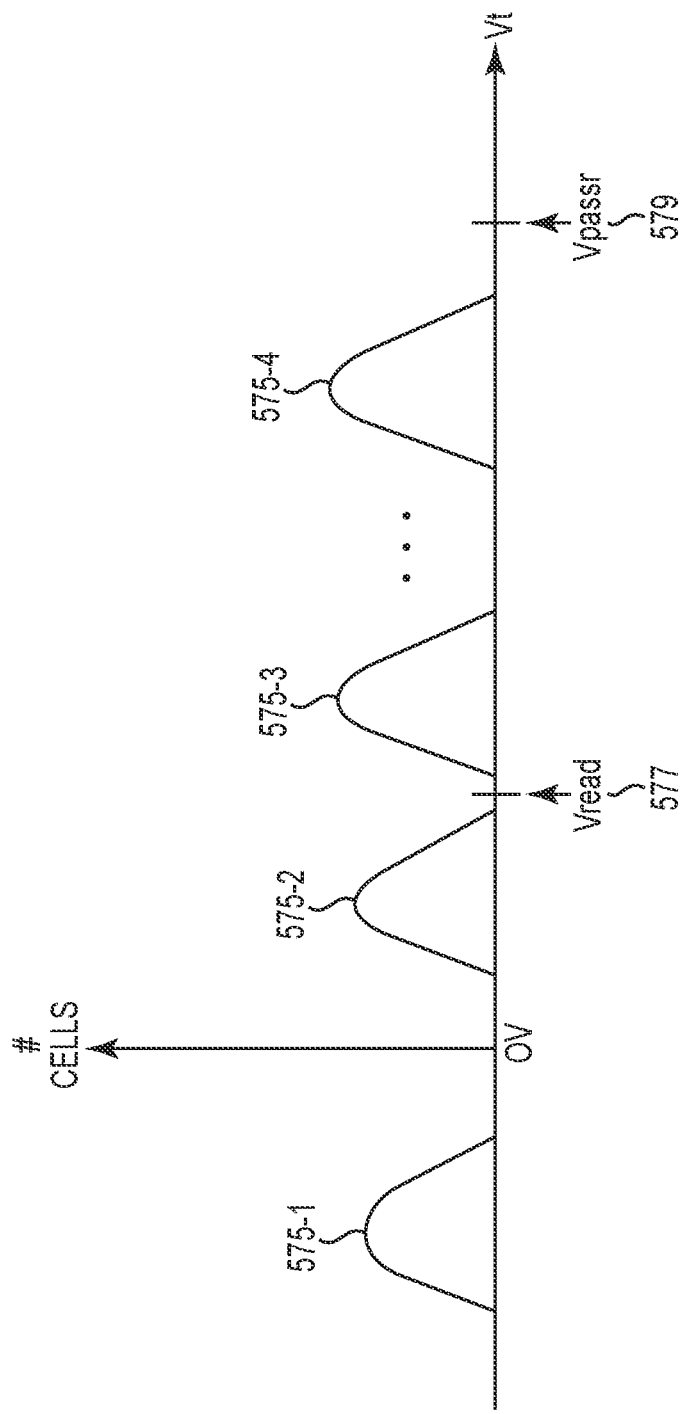
FIG. 5 illustrates example threshold voltage distributions associated with memory cells of an array having multiple erase blocks per string in accordance with various embodiments of the present disclosure.

FIG. 5 illustrates example threshold voltage distributions associated with memory cells of an array having multiple erase blocks per string in accordance with various embodiments of the present disclosure. The Vt distributions 575-1, 575-2, 575-3, and 575-4 represent states to which memory cells can be programmed. Although four states are shown, embodiments are not limited to a particular quantity of states or bits per cell. In various instances, the lowermost Vt distribution 575-1 is referred to as an erase state and is that state at which memory cells of an erase block are placed when erased. A programming operation can include increasing the Vt of a cell from the erase state 575-1 to one of the other states (e.g., 575-2, 575-3, 575-4).

FIG. 5 also illustrates an example read voltage 577 (Vread). As described in FIG. 3B, the read voltage 577 can be applied to a selected word line to determine whether the Vt of the selected cell is above or below Vread. If the Vt of the selected cell is below Vread, the cell will conduct and current through the string is sensed, and if the Vt of the selected cell is above Vread, the cell won't conduct and current won't be sensed. As illustrated, a read pass voltage 579 (Vpassr) is a voltage higher than the uppermost Vt state such that cells coupled to word lines biased at Vpassr will conduct regardless of their programmed state.

Figure 6:
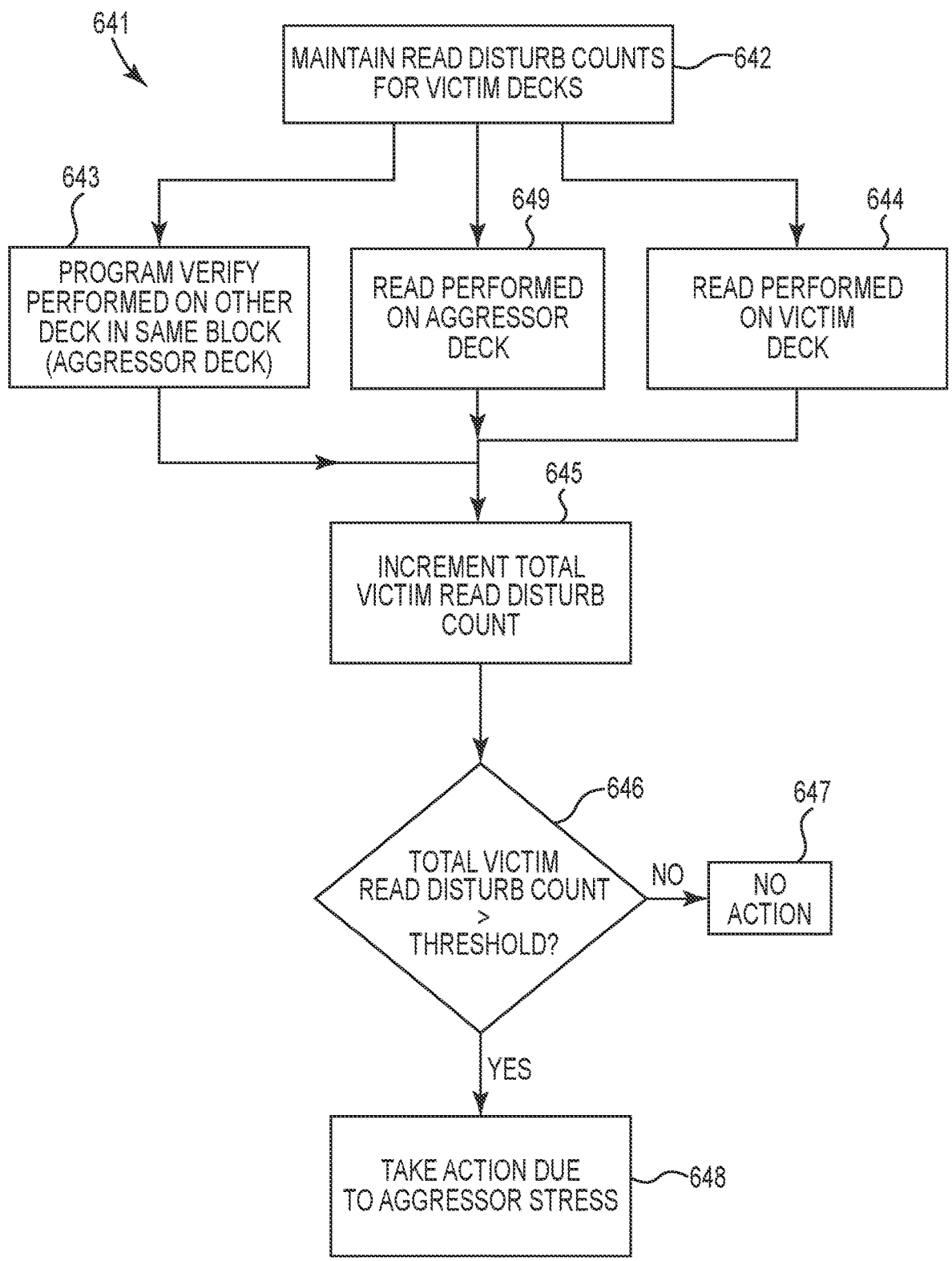
FIG. 6 is a flow diagram that illustrates an example method for tracking read disturb among multiple erase blocks coupled to a same string in accordance with various embodiments of the present disclosure.

FIG. 6 is a flow diagram that illustrates an example method 641 for tracking read disturb among multiple erase blocks coupled to a same string in accordance with various embodiments of the present disclosure. The method 641 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 641 is performed by the control circuitry 110 of FIG. 1 and/or the controller 1191 of FIG. 11. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At step 642, the method 641 includes maintaining read disturb counts for victim decks. The victim decks (e.g., erase blocks) can be as described above (e.g., decks 305-1/305-2, 405-1/405-2), or a super deck (e.g., 1015-1, 1015-2, . . . , 1015-D) as described in FIG. 10. The victim read disturb count can be maintained, for example via a counter (e.g., counter 1193) of a disturb tracking component (e.g., disturb tracking component 1197 described in FIG. 11).

At step 643, a program verify operation is performed on another deck (e.g., aggressor deck) that shares a string with the victim deck. Any deck that shares a string with the victim deck can be considered an aggressor deck since a program verify operation performed on any deck other than the victim deck that is coupled to the same strings as the victim deck can result in read disturb stress to the programmed cells of the victim deck (e.g., in the form of a Vt shift of the programmed cells).

At step 649, a read operation is performed on an aggressor deck, and at step 644, a read is performed on the victim deck. As illustrated in FIG. 6, the total victim read disturb count is incremented (e.g., at step 645) for each program verify operation performed on aggressor deck, for each read performed on the aggressor deck, and for each read performed on the victim deck.

At step 646 it is determined whether the total victim read disturb count corresponding to the victim deck exceeds a threshold count. If the total victim read disturb count does not yet exceed the threshold count, then no action is taken, as illustrated at step 647. However, if the total victim read disturb count corresponding to the victim deck exceeds the threshold count, then an action due to the aggressor deck stress on the victim deck is taken as illustrated at step 648. As described above, various actions can be taken responsive to the total victim read disturb count corresponding to the victim deck exceeding the threshold count. One example includes a refresh operation in which the data corresponding to the victim deck is moved (e.g., rewritten) to a different deck (e.g., in a different physical block). Upon being rewritten to the different/new deck, the method 641 can begin anew with the new deck now becoming a new victim deck and the total victim read cycle count corresponding to the new deck can be reset. It is noted that a read disturb count can also be tracked for the aggressor deck since an aggressor deck can also be a victim deck since read operations performed on victim decks also result in read disturb stress on aggressor decks.

Another action that can be taken responsive to a total victim read disturb count corresponding to a particular victim deck exceeding the threshold count is performing a scan operation on the victim deck. The scan operation can include reading the memory cells (e.g., pages) of the victim deck. For example, a BER can be determined based on the read operation(s), and a determination can be made regarding whether the data stored in the victim deck should be moved to a new/different deck.

FIG. 7A is a graph 787-1 illustrating an example of read disturb associated with performing read operations on an array having multiple erase blocks coupled to a same string in accordance with various embodiments of the present disclosure. Signals 780-1, 780-2, and 780-3 correspond the Vpassr bias voltage on unselected word lines during and after respective read operations READ1, READ2, and READ3. As shown, Vpassr read disturb stress at the Vpassr voltage level is experienced while the read operations are occurring (e.g., during time period 781). After the read operation completes, the Vpassr voltage gradually attenuates but continues to provide read disturb stress (referred to as latent read disturb stress). As shown, the amount (e.g., duration) of latent read disturb can depend on the delay between read operations. For example, the delay 782-1 between READ1 and READ2 is greater than the delay 782-2 between READ2 and READ3. As such, the total read disturb stress associated with READ1 (e.g., during time period 783-1) is greater than the total read disturb stress associated with READ2 (e.g., during time period 783-2).

In various embodiments, the latent read disturb associated with read operations can be accounted for in association with tracking a cumulative amount of read disturb experienced by a victim erase block/deck. For example, a disturb tracking component (e.g., tracking component 1197 shown in FIG. 11) can increment a victim read disturb counter by different amounts depending on the amount of latent read disturb corresponding to a particular read command. As an example, for a read operation performed on a victim deck, the victim read disturb counter can be incremented by a first amount if a time since a last read to the victim deck is below a threshold amount of time and by a second (e.g., different) amount if the time since the last read to the victim deck is above the threshold amount of time. Similarly, for a read operation performed on an aggressor deck, the victim read disturb counter can be incremented by a first amount if a time since a last read to the victim deck is below a threshold amount of time and by a second (e.g., different) amount if the time since the last read to the aggressor deck is above the threshold amount of time. Additionally, since reads performed on the victim deck can result in an increased read disturb (e.g., due to Vpassr1 stress) as compared to reads performed on the aggressor deck (e.g., Vpassr stress), a scaling factor can be used such that the victim read disturb counter is incremented by a greater amount for victim reads than for aggressor reads.

FIG. 7B includes graphs 787-2, 787-3, and 787-4 illustrating examples of read disturb associated with performing program operations on an array having multiple erase blocks coupled to a same string in accordance with various embodiments of the present disclosure. Graph 787-2 illustrates read disturb associated with block programming (BLK-PGM) of an aggressor deck whose word lines are programmed in a burst followed by a delay 782-3, 782-4 prior to a subsequent programming cycle in which the word lines of the aggressor deck are again programmed in a burst. Signals 780-4 and 780-5 represent the Vpassr read stress during the block program operations. Similar to the latent read disturb described in FIG. 7A in association with read operations, there can also be latent read disturb associated with program verify operations. In graph 787-2, the delays 782-3 and 782-4 between the block programming operations represent the latent read disturb between the block programming operations. Since the word lines of the block are programmed in bursts, there is minimal latent read disturb between consecutive page programming operations within the block programming operations or between consecutive program verify operations within the page programming operations. The delay between consecutive block programming cycles can depend on the rate of host traffic (e.g., which affects how frequently a block is garbage collected). It is noted that if an aggressor deck experiences a "hot" programming workload, the delay between block programming operations might become very small, which would reduce the latent read disturb associated with the block programming operations.

Graph 787-3 illustrates read disturb associated with an aggressor deck having a page to page program delay within a particular program cycle. For example, after an aggressor deck has been assigned for programming, the rate of host program operations can be unpredictable such that subgroups of the word lines (e.g., pages) of the deck can be programmed with delay 782-5, 782-6 in between the programming of the sub-groups. Signals 780-6, 780-7, and 780-8 represent the Vpassr read stress during the delays 782-5 and 782-6.

Graph 787-4 illustrates read disturb associated with an aggressor deck having a program verify (PV) to program verify delay 782-7, 782-8 within a single page program time (tPROG). The delays between program verify operations within a particular program operation can result in an increases read disturb as compared to programming operations without verify to verify delays (e.g., due to the latent read disturb resulting from the delays 782-7 and 782-8).

As illustrated by graphs 787-2, 787-3, and 787-4, different types of programming operations result in different amounts of read disturb and latent read disturb. The different types of programming operations performed on an aggressor deck can depend on the host workload, which can be a mix of sequential writes (e.g., burst traffic) and random writes, for example. In various embodiments, a particular type of programming operation can be determined, for example, by monitoring queued host commands to be executed. In such instances, a victim read disturb count can be incremented by differing amounts based on the determined type of programming and corresponding latent read disturb, for example. For instance, different aggressor program scaling factors can be used to increment the victim read disturb count based on the type of programming. For example, in instances in which there is threshold delay between program verify operations, the read disturb count can be incremented by a greater amount than in instances in which there is not a threshold delay between program verify operations. Similarly, a scaling factor for incrementing read disturb counts due to program verifies associated with block program operations such as shown in graph 787-2 can be different than a scaling factor for incrementing the read disturb count due to program verifies associated with page programming operations such as shown in graph 787-3.

FIG. 8 is a table 840 illustrating an example of victim read count increments associated with different operations performed on a victim deck and an aggressor deck in association with tracking read disturb in an array having multiple erase blocks coupled to a same string in accordance with various embodiments of the present disclosure. In table 840, the read disturb count is incremented by a value X for each read operation performed on the victim deck. The read disturb count value can be incremented by a read scaling factor which can be a function of a determined read to read delay as described above. For example, responsive to the read to read delay being below a threshold value, the read disturb count might be incremented by X (e.g., X=1) and if the read to read delay is above the threshold value, the read disturb count might be incremented by 1.2X, 1.3X, etc. to account for the latent read disturb associated with read to read delay.

In table 840, the read disturb count is incremented by a program scaling factor (e.g., 2X, 3X, 4X, etc.) responsive to a programming operation on an aggressor deck. The scaling factor can account for the fact that a programming operation includes multiple program verify operations, so a page program operation can result in an equivalent amount of victim read disturb as one read operation on the victim deck. As discussed above, the particular scaling factor can be a function of the type of program operation. For example, block programming operations that involve little page to page program delay, page to page programming operations that involve some page to page delay but little program verify to program verify delay, and programming operations that include program verify to program verify delay due to program suspends within a particular page programming time tPROG can all have different corresponding program scaling factors associated therewith.

As shown in table 840, the victim read disturb count is incremented by an aggressor read scaling factor (e.g., 0.2X, 0.3X, 0.4X, etc.) responsive to a read operation performed on an aggressor deck. As noted above, the read scaling factor can account for the fact that aggressor reads generally result in a reduced amount of victim read disturb as compared to victim reads (e.g., due to Vpassr1 disturb stress associated with victim reads as compared to Vpassr disturb stress associated with aggressor reads). The magnitude of the aggressor read scaling factor can be a function of the corresponding read to read interval (e.g., delay) associated with the aggressor read. For example, aggressor reads with a longer delay therebetween can result in a greater amount of victim read disturb (e.g., due to latent read disturb) as compared to aggressor reads with shorter delays therebetween.

Figure 9:
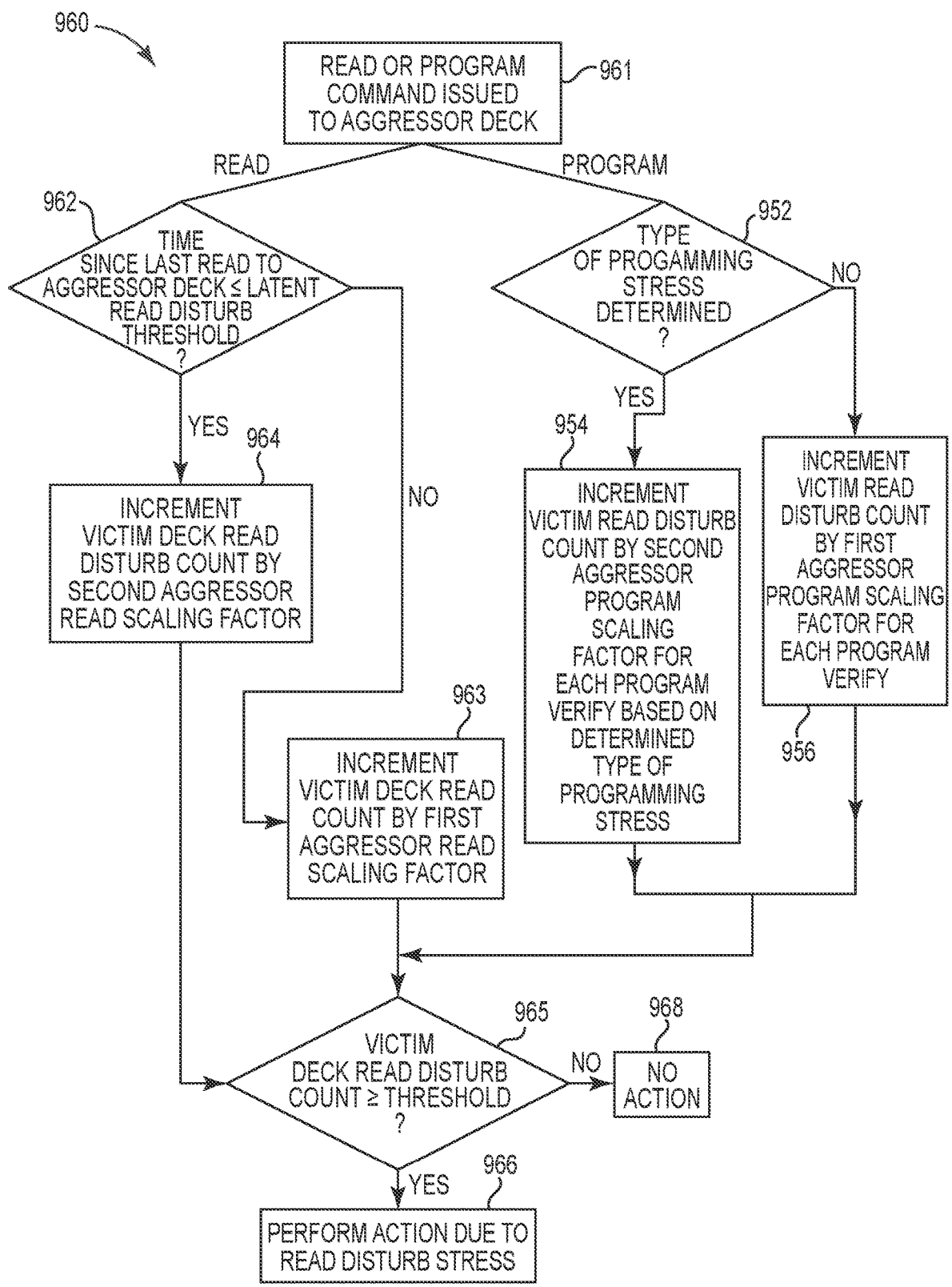
FIG. 9 is a flow diagram that illustrates an example method for tracking read disturb among multiple erase blocks coupled to a same string in accordance with various embodiments of the present disclosure.

FIG. 9 is a flow diagram 960 that illustrates an example method for tracking read disturb among multiple erase blocks coupled to a same string in accordance with various embodiments of the present disclosure. At step 961, a read or a program operation is performed on (e.g., issued to) an aggressor deck (e.g., from a command queue). At step 962, a time period since a last aggressor read is compared to a latent read disturb threshold. If the time since the last read to the aggressor deck is greater than the latent read disturb threshold, then the victim deck read disturb count is incremented by a first aggressor read scaling factor at step 963. If the time since the last read to the aggressor deck is less than (or equal to) the latent read disturb threshold, then the victim read disturb count is incremented by a second (e.g., different) read scaling factor.

At step 952, a determination is made regarding the type of programming stress associated with the program command. If the particular type of programming stress is not determined, then the victim read disturb count can be incremented by a first aggressor program scaling factor for each program verify corresponding to the program operation. As noted above, the aggressor program scaling factor might be such that the program operation, which includes multiple program verify operations, results in a victim read count increment amount equal to 2, 3, or 4 times the victim read count increment amount for a read operation to the victim deck. If the particular type of programming stress is determined, then the victim read disturb count can be incremented by a second aggressor program scaling factor for each program verify corresponding to the program operation. The second aggressor program scaling factor can be based on the determined type of programming stress. For example, if the type of programming stress is determined to be block program to block program stress, then the second aggressor scaling factor can be first value, and if the type of programming stress is determined to be page to page program stress, then the second aggressor scaling factor can be a second/different value.

At step 965, the victim deck read disturb count is compared to a read disturb count threshold. If the victim deck read disturb count is less than the read disturb count threshold, then no action is taken at step 968. If the victim deck read disturb count is greater than or equal to the read disturb count threshold, then an action is performed due to the cumulative amount of aggressor stress at step 966. As described herein, the action performed can include a refresh or scan operation on the victim deck; however, embodiments are not so limited.

Figure 10:
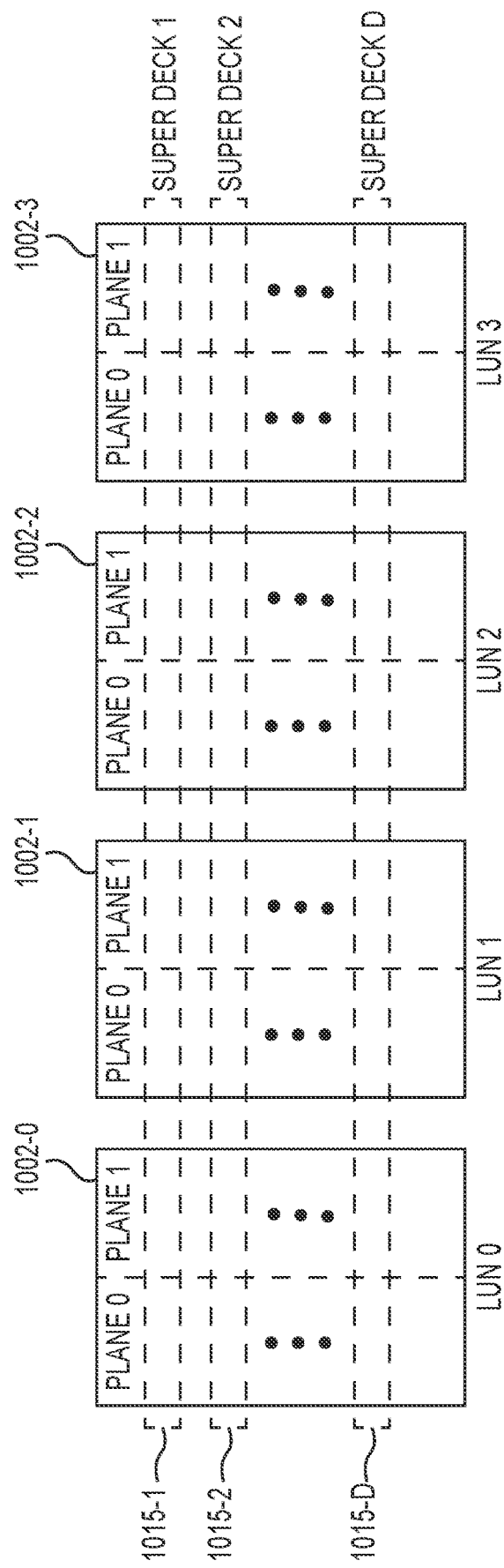
FIG. 10 illustrates a portion of a memory device having multiple erase blocks per string in accordance with various embodiments of the present disclosure.

FIG. 10 illustrates a portion of a memory device having multiple erase blocks per string in accordance with various embodiments of the present disclosure. In various embodiments, the physical blocks of a memory array can be organized into planes. For example, FIG. 10 illustrates memory arrays 1002-0, 1002-1, 1002-3, and 1002-4 each divided into a first plane (PLANE 0) of physical blocks and a second plane (PLANE 1) of physical blocks. Embodiments are not limited to a particular quantity of planes per array. Each array 1002-0, 1002-1, 1002-3, and 1002-4 corresponds to a respective logical unit (LUN) LUN0, LUN1, LUN2, and LUN3. Each LUN can correspond to a different memory device (e.g., memory device 100 shown in FIG. 1); however, embodiments are not so limited. For example, a memory device (e.g., die) can include multiple LUNs. A LUN can, for example, correspond to a smallest unit that can independently execute commands and report status.

The physical blocks of the planes can comprise multiple erase blocks sharing common strings as described herein. The physical blocks can be grouped into "super blocks" with each super block comprising a physical block from each plane (e.g., PLANE 0 and PLANE 1) across multiple LUNs (e.g., across multiple arrays 1002). Similarly, embodiments of the present disclosure an include a number of super decks 1015-1 (SUPER DECK_1), 1015-2 (SUPER DECK_2), . . . , 1015-D (SUPER DECK D). Each super deck (or super erase block) 1015 can comprise a deck from each plane across multiple LUNs. For example, a first super deck 1015-1 (SUPER DECK_1) can comprise a deck from plane 0 of LUN0, a deck from plane 1 of LUN1, a deck from plane 0 of LUN1, a deck from plane 1 of LUN1, a deck from plane 0 of LUN2, a deck from plane 1 of LUN2, a deck from plane 0 of LUN3, and a deck from plane 1 of LUN3.

Embodiments of the present disclosure can monitor read disturb on a super deck level as well as, or instead of, on a deck level. For instance, consider an example in which the constituent decks of a super deck 1015-1 share common strings with the respective constituent decks of a super deck 1015-2 (e.g., super decks 1015-1 and 1015-2 are located in a same physical super block). The decks of super deck 1015-1 can be erased together as a group and therefore can be considered an aggressor super deck since the read and program operations performed thereon can contribute to read disturb on each of the victim decks of the corresponding victim super deck 1015-2. In various embodiments, a victim read disturb count based on victim reads, aggressor reads, and aggressor program verifies can be maintained on a deck level and/or on a super deck level.

Figure 11:
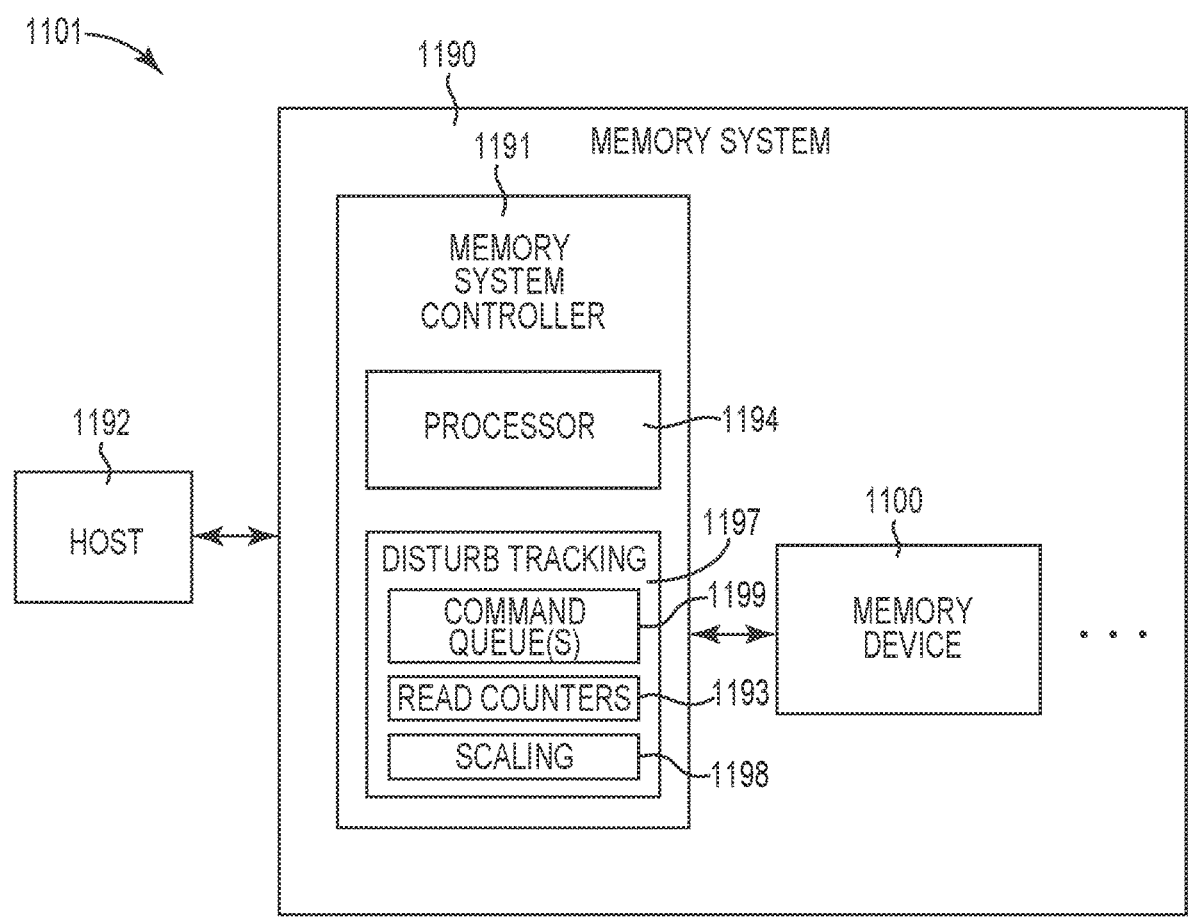
FIG. 11 illustrates an example computing system having a memory system for performing disturb tracking among multiple erase blocks coupled to a same string in accordance with various embodiments of the present disclosure.

FIG. 11 illustrates an example computing system 1101 having a memory system 1190 for performing disturb tracking among multiple erase blocks coupled to a same string in accordance with various embodiments of the present disclosure. As shown in FIG. 11, the memory system 1190 includes a system controller 1191 and a number of memory devices 1100, which can be memory devices such as device 100 described in FIG. 1 (e.g., memory devices comprising memory arrays having multiple erase blocks coupled to common strings).

In some embodiments, the memory system 1190 is a storage system. An example of a storage system is a solid-state drive (SSD). In some embodiments, the memory system 1190 is a hybrid memory/storage sub-system. In general, the computing environment shown in FIG. 11 can include a host system 1192 that uses the memory system 1190. For example, the host system 1192 can write data to the memory system 1190 and read data from the memory system 1190.

The memory system controller 1191 (hereinafter referred to as "controller") can communicate with the memory devices 1100 to perform operations such as reading data, writing data, or erasing data at the memory devices 1100 and other such operations. The controller 1191 can include hardware such as one or more integrated circuits and/or discrete components, a buffer memory, or a combination thereof. The controller 1191 can include a microcontroller, special purpose logic circuitry (e.g., a field programmable gate array (FPGA), an application specific integrated circuit (ASIC), etc.), or other suitable processing circuitry. The controller 1191 can include a processing device (e.g., processor 1194) configured to execute instructions stored in local memory (not shown).

In this example, the controller 1191 includes a disturb tracking component 1197 that can be responsible for monitoring read disturb experienced by victim decks due to program (e.g., program verify) and read operations performed on aggressor decks, as well as due to read operations performed on the victim deck, as described herein. As shown in FIG. 11, the disturb tracking component 1197 can include read counters 1193, a scaling component 1198, and command queues 1199. The read counters 1193 can include multiple counters used to track read disturb counts at a word line (e.g., page) level, deck level, and/or super deck level, for example. The read counters can be incremented according to multiple different scaling factors based on various factors including, but not limited to, type of aggressor program operation, read to read delay, etc.

The command queues 1199 can store read and program commands to be issued to the memory devices 1100. The queued commands can be monitored by the disturb tracking component 1197 to determine appropriate read disturb scaling factors based on the host traffic. For example, the disturb tracking component 1197 can determine workload patterns such as sequential read patterns or random read patterns and adjust read disturb scaling factors based thereon.

In general, the controller 1191 can receive commands or operations from the host system 1192 and can convert the commands or operations into instructions or appropriate commands to achieve the desired access to the memory devices 1100. The controller 1191 can be responsible for other operations such as wear leveling operations, garbage collection operations, error detection and error-correcting code (ECC) operations, encryption operations, caching operations, and address translations between a logical block address and a physical block address that are associated with the memory devices 1100.

The host system 1192 can be a computing device such as a desktop computer, laptop computer, network server, mobile device, or other such computing device that includes a memory and a processing device. The host system 1192 can include, or be coupled to, the memory system 1190 so that the host system 1192 can read data from or write data to the memory system 1190. The host system 1192 can be coupled to the memory system 790 via a physical host interface (not shown in FIG. 11). As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, a universal flash storage (UFS) interface, a universal serial bus (USB) interface, Fibre Channel, Serial Attached SCSI (SAS), etc. The physical host interface can be used to transmit data between the host system 1192 and the memory system 1190. The host system 1192 can further utilize an NVM Express (NVMe) interface to access the memory devices 1100 when the memory system 1190 is coupled with the host system 1192 by the PCIe interface. The physical host interface can provide an interface for passing control, address, data, and other signals between the memory system 1190 and the host system 1192.

While the example memory system 1190 in FIG. 11 has been illustrated as including the controller 1191, in another embodiment of the present disclosure, a memory system 1190 may not include a controller 1191, and can instead rely upon external control (e.g., provided by a processor or controller separate from the memory system 1190, such as by host 1192 communicating directly with the memory devices 1100).

Although the memory system 1190 is shown as physically separate from the host 1192, in a number of embodiments the memory system 1190 can be embedded within the host 1192. Alternatively, the memory system 1190 can be removable from the host 1192.

As used herein, an "apparatus" can refer to various structural components. For example, the computing system 1101 shown in FIG. 11 can be considered an apparatus. Alternatively, the host 1192, the controller 1191, and the memory device 1100 might each separately be considered an apparatus.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C). Additionally, the phrase "at least one of A and B" means one or more of (A) or one or more of (B), or one or more of (A) and one or more of (B) such that both one or more of (A) and one or more of (B) is not required.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
 a memory array comprising a plurality of strings of memory cells, wherein each string of the plurality of strings comprises:
  a first group of memory cells coupled to a first group of access lines and corresponding to a first erase block; and
  a second group of memory cells coupled to a second group of access lines and corresponding to a second erase block; and
 a controller coupled to the memory array and configured to:
  monitor a cumulative amount of read disturb stress experienced by the first erase block due to read operations performed on the first erase block, read operations performed on the second erase block, and program verify operations performed on the second erase block by:
  maintaining a read disturb count corresponding to the first erase block;
   incrementing the read disturb count by a first amount responsive to read commands issued to addresses corresponding to the first erase block;
   incrementing the read disturb count by a read disturb scaling factor responsive to read commands issued to addresses corresponding to the second erase block; and
   incrementing the read disturb count by a program scaling factor responsive to program commands issued to addresses corresponding to the second erase block; and
  perform an action on the first erase block responsive to the read disturb count exceeding a threshold value.

2. The apparatus of claim 1, wherein the controller is configured to, responsive to a particular read command issued to a particular address corresponding to the second erase block:
 responsive to determining that a time since a last read command was issued to the particular address is less than a threshold time, incrementing the read disturb count by a particular read disturb scaling factor; and
 responsive to determining that the time since the last read command was issued to the particular address is greater than a threshold time, incrementing the read disturb count by a different particular read disturb scaling factor.

3. The apparatus of claim 1, wherein the controller is configured to, responsive to program commands issued to addresses corresponding to the second erase block, increment the read disturb count by different program scaling factors depending on a determined type of programming.

4. The apparatus of claim 1, wherein the controller is configured to, for program commands issued to addresses corresponding to the second erase block:
 if a type of programming is determined for the program commands, increment the read disturb count by a first program scaling factor for each of the program commands; and
 if a type of programming is not determined for the program commands, increment the read disturb count by a second program scaling factor for each of the program commands.

5. The apparatus of claim 4, wherein the controller is configured to, for program commands issued to addresses corresponding to the second erase block:
 if the type of programming is determined for the program commands, increment the read disturb count by different program scaling factors depending on the determined type of programming.

6. The apparatus of claim 1, wherein the read disturb scaling factor is based, at least partially, on a quantity of read strobes associated with the read commands issued to the addresses corresponding to the second erase block.

7. The apparatus of claim 1, wherein the program scaling factor is based, at least partially, on a quantity of program verify strobes associated with the program commands issued to the addresses corresponding to the second erase block.

8. The apparatus of claim 1, wherein the controller is configured to:
 maintain a count of the read commands issued to addresses corresponding to the first erase block;
 maintain a count of the read commands issued to addresses corresponding to the second erase block;
 perform an action on the first erase block responsive to determining that the count of the read commands issued to addresses corresponding to the first erase block reaches a threshold count; and
 perform an action on the first erase block responsive to determining that the count of the read commands issued to addresses corresponding to the second erase block reaches a threshold count.

9. The apparatus of claim 1, wherein each string of the plurality of strings further comprises a third group of access lines located between the first group of access lines and the second group of access lines.

10. The apparatus of claim 9, wherein the third group of access lines are dummy access lines that are coupled to memory cells that are not used to store user data.

11. The apparatus of claim 1, wherein:
 the plurality of strings is a first plurality of strings, and wherein the memory array comprises a second plurality of strings, wherein each string of the second plurality of strings comprises:

a third group of memory cells coupled to a third group of access lines and corresponding to a third erase block; and a fourth group of memory cells coupled to a fourth group of access lines and corresponding to a fourth erase block; and the action comprises performing a refresh operation on the first group of memory cells that includes copying contents of the first group of memory cells to the third erase block.

12. The apparatus of claim 1, wherein the action comprises performing a scan operation on the first group of memory cells, the scan operation comprising:

performing a read operation on the memory cells of the first erase block;

and determining a bit error rate based on the read operation.

13. A method, comprising:

tracking a cumulative amount of read disturb experienced by a first erase block by:

incrementing a read disturb count by a first amount responsive to read operations performed on the first erase block;

incrementing the read disturb count by a first scaling factor responsive to read operations performed on a second erase block; and incrementing the read disturb count by a second scaling factor responsive to program operations performed on the second erase block;

wherein the first erase block and the second erase block are within a same physical block of memory cells of an array, wherein the physical block comprises a plurality of strings with each string of the plurality of strings comprising:

a first group of memory cells coupled to a first group of access lines corresponding to the first erase block; and a second group of memory cells coupled to a second group of access lines corresponding to the second erase block; and performing an action on the first erase block responsive to determining that the read disturb count has reached a threshold value.

14. The method of claim 13, wherein the second scaling factor is based, at least partially, on a quantity of program verify operations corresponding to the program operations.

15. The method of claim 13, wherein the method includes:

determining, by monitoring host commands, a type of programming associated with a particular program operation performed on the second erase block; and adjusting the second scaling factor based, at least partially, on the determined type of programming associated with the particular program operation performed on the second erase block.

16. The method of claim 13, wherein the method includes:

monitoring a time between read operations performed on the second erase block;

for a particular read operation directed to the second erase block, adjusting the first scaling factor corresponding to the particular read operation based on whether the time between read operations has reached a threshold amount of time.

17. An apparatus, comprising:

a memory array comprising a plurality of physical blocks of memory cells, each physical block of memory cells of the plurality of physical blocks comprising a plurality of strings of memory cells, wherein a first string of the plurality of strings corresponds to multiple erase blocks of a particular physical block that are erasable at different times, and wherein the first string comprises:

a first group of memory cells coupled to a first group of access lines and corresponding to a first erase block of the multiple erase blocks; and a second group of memory cells coupled to a second group of access lines and corresponding to a second erase block; and a number of dummy access lines separating the first group of access lines from the second group of access lines; and a controller coupled to the memory array and configured to:

maintain a read disturb counter corresponding to the first erase block;

increment a read disturb count of the read disturb counter by a first amount responsive to read operations performed on the first erase block;

increment the read disturb count by a first scaling factor responsive to read operations performed on the second erase block; and increment the read disturb count by a second scaling factor responsive to program operations performed on the second erase block.

18. The apparatus of claim 17, wherein the controller is configured to perform an action on the first erase block responsive to the read disturb counter exceeding a threshold count.

19. The apparatus of claim 17, wherein the controller is configured to perform a scan operation on the first erase block or a refresh operation on the first erase block responsive to the read disturb count exceeding the threshold count.

20. The apparatus of claim 17, wherein the first scaling factor is a function of a read to read delay associated with the read operations performed on the second erase block.

* * * * *